United States Patent [19]

Gordon

[11] 4,302,703
[45] Nov. 24, 1981

[54] VIDEO STORAGE SYSTEM

[75] Inventor: Eugene I. Gordon, Convent Station, N.J.

[73] Assignee: Bell Telephone Laboratories, Incorporated, Murray Hill, N.J.

[21] Appl. No.: 209,990

[22] Filed: Dec. 20, 1971

Related U.S. Application Data

[63] Continuation of Ser. No. 875,253, Nov. 10, 1969, abandoned.

[51] Int. Cl.³ .............................................. H01J 29/50
[52] U.S. Cl. ................................................ 315/13 ST
[58] Field of Search .................. 315/10, 11, 12, 13 ST

[56] References Cited

U.S. PATENT DOCUMENTS

| | | | |
|---|---|---|---|
| 3,401,294 | 9/1968 | Cricchi et al. | 315/12 |
| 3,401,299 | 9/1968 | Crowell | 315/12 |
| 3,419,746 | 1/1969 | Crowell et al. | 315/11 |
| 3,440,477 | 4/1969 | Crowell et al. | 315/11 |
| 3,519,874 | 7/1970 | Pearson | 315/12 |
| 3,523,208 | 8/1970 | Bodmer et al. | 313/66 X |
| 3,567,990 | 3/1971 | Whymark | 315/12 |
| 3,631,294 | 12/1971 | Hofstein | 315/12 |
| 3,646,391 | 2/1972 | Hofstein | 315/12 |

OTHER PUBLICATIONS

*Recent Developments in Low-Light-Level Camera Tubes,* Laponsky et al., Westinghouse Eng'r., May 1971, pp. 81-92.

*Primary Examiner*—Peter A. Nelson
*Attorney, Agent, or Firm*—Peter V. D. Wilde

[57] ABSTRACT

The specification describes a video storage system employing a unique memory tube. The tube employs a single read-write electron beam. The storage target is an insulating grid formed directly on a semiconductor substrate. Since the grid is supported, it can be made very fine and the processing advantageously uses photolithographic techniques.

18 Claims, 2 Drawing Figures

VIDEO STORAGE SYSTEM

This application is a continuation of application Ser. No. 875,253, filed Nov. 10, 1969, and now abandoned.

This invention relates to video systems and specifically to electron beam memory tubes.

It has become standard in the art to refer to the electron tube of a video camera as a storage tube. However, the essential function of such a device is to convert an optical image to an electrical signal. The storage feature is incidental.

The art does however have a need for electron storage tubes wherein the storage feature is the primary object. These tubes are of the signal-to-signal variety and function as memory cells.

The conventional storage medium for video signals is magnetic tape. It allows a continuing sequence of video frames to be stored indefinitely. There is also a need for video systems which transmit single frames of stationary images, e.g., printed documents. Such systems advantageously use memory tubes so that a single selected image can be stored and later recalled.

This invention is directed to an electron beam memory tube that is capable of providing the foregoing functions, i.e., storing an electrical pattern of an image for periods of a few seconds to several minutes, or even hours. It employs a novel high resolution target and a single electron beam forming means for both writing and reading. In the writing mode the electron beam is modulated with the image information as it scans an insulating storage layer. A charge pattern corresponding to the image is stored on the insulating layer. The charge pattern is later detected by scanning the target.

These and other aspects of the invention will be apparent from the following detailed description. In the drawing.

Figure 1:
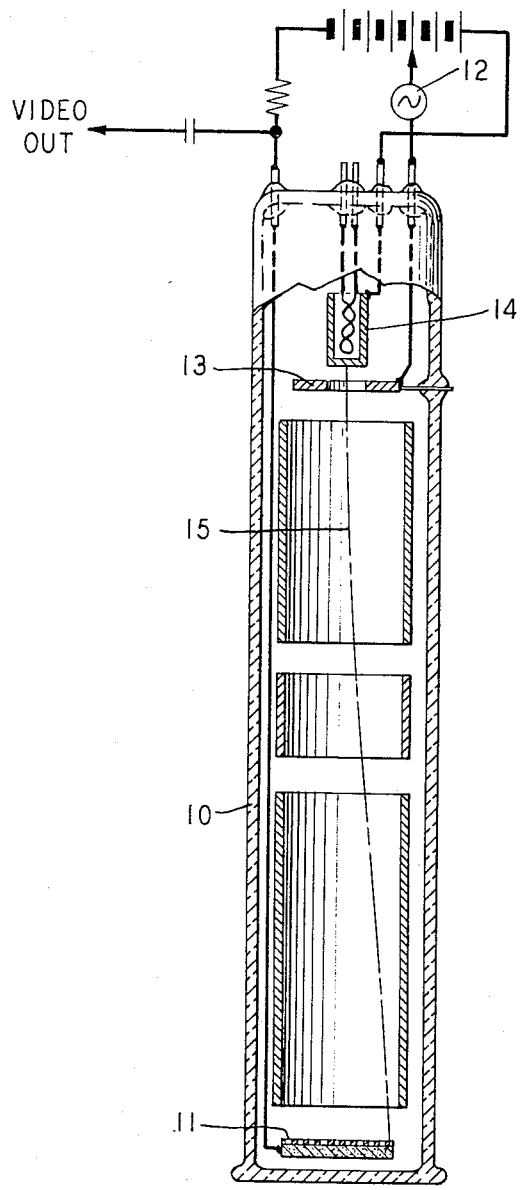
FIG. 1 is a schematic sectional view of the memory tube of the invention.

The electron tube 10 of FIG. 1 is basically of standard construction. The distinguishing elements are the target 11 which is shown in greater detail in FIG. 2 and the inclusion of a means for modulating the beam intensity in accordance with an input signal 12. The latter is shown here as the grid control electrode 13 although the same objective can be reached by modulating the decelerating mesh (not shown) or the voltage on cathode 14.

The electron beam 15, modulated with the image information received from a remote source, is controlled to scan the target 11 by well established means not shown.

Figure 2:
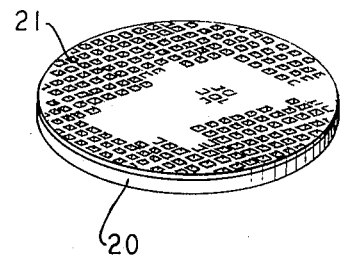
FIG. 2 is a perspective view of the target of the tube of FIG. 1.

As seen in FIG. 2 the target 11 comprises a substrate 20 covered with an insulating grid 21. The substrate is preferably a semiconductor and is coated directly with an insulating layer. The reason for this will become evident.

The modulated electron beam deposits a charge pattern on the insulating layer. This charge pattern can be stable for several seconds and even hours with appropriate choice of the material for the storage layer 21 and good vacuum conditions in the tube. The charge pattern is later read using the same electron beam used to form the pattern but this time with a constant cathode potential. As the reading beam scans the grid, the cathode to target (substrate 20) voltage is modulated in accordance with the spatial distribution of charge on the insulating layer thus reconstructing the video signal.

Referring again to the target of FIG. 2, the grid arrangement contributes significant advantages over those of prior art tubes. The grid storage elements of prior art tubes are typically semi-transparent mesh structures. The mesh transparency determines the permissible resolution of the target. Very fine meshes (i.e., high transparency) are desirable. However, the extent to which the mesh transparency can be increased in limited by the necessity of retaining structural rigidity. The mesh cannot be free to vibrate as the result of small impacts or from mechanical (e.g., acoustical) resonances that are inevitably present.

The grid structure of this invention is specifically integrated with a support substrate. This is possible with this tube design since it is not a requirement that the grid-collector assembly be transparent. In this arrangement not only does the substrate lend support but the grid can be formed by photolithographic techniques. The result of the latter feature is a grid having an unusually high degree of transparency, and thus an electron tube of exceptional resolution.

Photolithographic techniques are especially well developed for semiconductor materials and, in particular, for silicon. Accordingly in a preferred embodiment of this invention the target comprises a silicon substrate with an $SiO_2$ grid. The target can be made by steam oxidizing a silicon wafer to form an $SiO_2$ coating of the order of $0.5\mu$ thick and etching the oxide to form the grid by conventional photolithography. By this technique a grid with 2500 lines per inch is easily obtained with a transparency (with $2\mu$ lines) of 64%. This compares with a conventional grid having typically 1000 lines/in. and a transparency (with $7\mu$ lines) of approximately 53%. By way of further comparison a grid made according to the invention with 1000 lines per in. and $2\mu$ lines has a transparency of almost 85%. Thus the storage grid of this invention can be made considerably finer with both greater rigidity and economy.

The remaining details of operation of the tube are conventional in the art. For example similar devices are described in U.S. Pat. Nos. 3,407,329, 2,869,025 and 3,293,484.

The grid geometry shown in FIG. 2 is exemplary only. It is equally convenient to etch an array of circular windows in the layer 21, or openings of any other shape and grid configuration.

The output signal is taken from the substrate in FIG. 1. The tube can operate as well in the known return beam configuration or the output signal can be taken from a collector mesh located adjacent to the target.

As noted above the exceptional grid transparencies obtainable by virtue of the invention are largely attributable to the fine (e.g., $2\mu$) line widths that can be produced by photolithographic techniques. It is considered that the benefits of the invention are obtained when the line widths are less than $5\mu$ in width. The use of grids having more than 1500 lines per inch is also considered to be a benefit of the invention.

What is claimed is:

1. A video storage system comprising in combination:
   an electron beam memory tube containing a single electron beam forming and scanning means for both storing and reading video information,
   signal means for modulating the electron beam in accordance with the video information, a storage target comprising a semiconductor substrate and an insulating layer formed on a surface of the semiconductor substrate so as to be structurally integral therewith, the insulating layer having an array of openings etched therethrough to form an insulating grid configuration with grid lines defining storage locations for the video information, said storage target being positioned in said memory tube to receive the modulated electron beam and to store the video information on the insulating layer in the form of an electrostatic charge pattern, means for activating the electron beam to scan the insulating layer of the target at a uniform unmodulated potential, and video output means for detecting the localized permeability of the grid of the insulating layer to the unmodulated electron beam.

2. The storage system of claim 1 in which the semiconductor substrate is silicon and the insulating layer is silicon oxide.

3. The storage system of claim 2 in which the grid lines are less than 5μ in width.

4. The storage system of claim 2 in which the grid spacing is more than 1500 lines per inch.

5. A video storage system comprising in combination:

an electron beam memory tube containing a single electron beam forming and scanning means for both storing and reading video information, signal means for modulating the electron beam in accordance with the video information, p1 a storage target comprising a semiconductor substrate of a substantially uniform conductivity type and an insulating layer formed on a surface of the semiconductor substrate so as to be structurally integral therewith, the insulating layer having an array of openings etched therethrough to form an insulating grid configuration with grid lines defining storage locations for the video information, said storage target being positioned in said memory tube to receive the modulated electron beam and to store the video information on the insulating layer in the form of an electrostatic charge pattern, means for activating the electron beam to scan the insulating layer of the target at a uniform modulated potential, and video output means for detecting the localized permeability of the grid of the insulating layer to the unmodulated electron beam.

6. The storage system of claim 5 in which the semiconductor substrate is silicon and the insulating layer is silicon oxide.

7. The storage system of claim 6 in which the grid lines are less than 5μ in width and the grid spacing is more than 1500 lines per inch.

8. The storage system of claim 5 in which the output means detects the electron flow through the grid.

9. The storage system of claim 5 in which the output means detects the electron flow deflected by the grid.

10. The storage system of claim 9 in which the output means includes a collector mesh located adjacent to the grid of the target, said collector mesh detecting the electron flow deflected by the grid in a return beam configuration.

11. An electronic storage tube including a target which is comprised of a pattern of conducting and insulating areas, the tube comprising:

means for applying a signal to the target to establish a desired stored charge distribution on the insulating areas; and means for detecting the stored charge distribution established on the target; and wherein the conducting areas are electrically connected to each other and are formed of silicon; and the insulating areas are formed of silicon dioxide.

12. The invention of claim 11 including:

a conducting substrate; and an insulating layer overlying the conducting substrate;

the insulating layer having openings therein such that the pattern of conducting and insulating areas is formed thereby.

13. The invention of claim 11 including a conducting substrate of silicon and insulating areas overlying the conducting substrate such that the pattern of conducting and insulating areas is formed thereby.

14. The invention of claim 11 wherein the insulating area is genetically derived from the conducting area.

15. The invention of claim 14 including:

a conducting substrate; and an insulating layer overlying the conducting substrate;

the insulating layer having openings therein such that the pattern of conducting and insulating areas is formed thereby.

16. The invention of claim 14 including a conducting substrate of silicon and insulating areas overlying the conducting substrate such that the pattern of conducting and insulating areas is formed thereby.

17. An electronic storage tube comprising:

a target having a pattern of alternating conducting areas and insulating areas;

an output terminal;

the conducting areas being electrically connected to the output terminal;

means for applying an input signal to the target such that a signal is stored thereon in the form of a desired stored charge distribution on the insulating areas;

means for scanning the target and obtaining an output signal at the output terminal which output signal is a function of the stored charge distribution on the insulating areas; and wherein the conducting areas are formed of silicon; and the insulating areas are formed of silicon dioxide.

18. The invention of claim 17 wherein the insulating areas are genetically derived.

* * * * *